[11] 3,628,869

| [72] | Inventors | Burton R. Clay<br>55 Sedgemeadow Road, Wayland, Mass. 01778;<br>Wilfred A. Strickland, 84 Francis Wyman Road, Burlington, Mass. 01803 |
|---|---|---|
| [21] | Appl. No. | 804,836 |
| [22] | Filed | Mar. 6, 1969 |
| [45] | Patented | Dec. 21, 1971 |

[54] AUTOCOLLIMATOR INCLUDING A RETROFLECTOR ELEMENT
5 Claims, 2 Drawing Figs.

[52] U.S. Cl. .................................................... 356/153, 356/172
[51] Int. Cl. ................................................. G01b 11/26
[50] Field of Search ....................................... 356/153, 138, 150, 172; 350/202

[56] References Cited
UNITED STATES PATENTS

| 2,701,501 | 2/1955 | Cuny ............................ | 356/153 |
| 3,290,986 | 12/1966 | Woehl .......................... | 356/138 |

FOREIGN PATENTS

| 1,099,213 | 2/1961 | Germany ...................... | 356/153 |
| 1,025,745 | 4/1966 | Great Britain ................ | 356/150 |

*Primary Examiner*—Ronald L. Wibert
*Assistant Examiner*—T. Major
*Attorney*—Edward J. Norton ABSTRACT: A collimator is disclosed which may be energized by a light source such as a laser and which includes means having a large field of view for expediting the finding of the light reflected from a reflecting surface to be oriented. The collimator includes means having a small field of view for making final adjustments in orienting the reflector, there being no moving parts in or between these two means. A built-in, sturdy reference device is provided which is independent of small errors in adjustment of parts of the collimator.

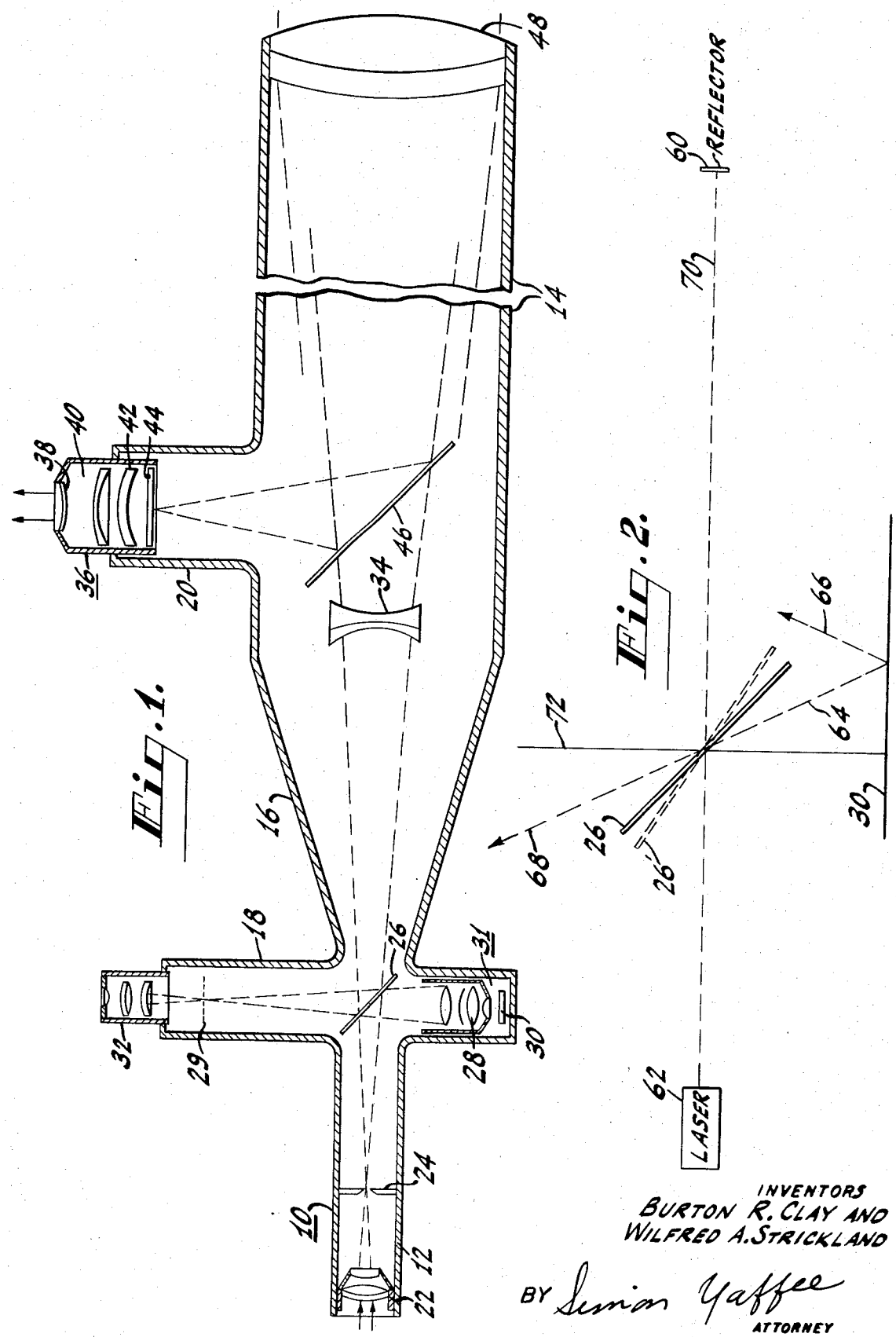

3,628,869

AUTOCOLLIMATOR INCLUDING A RETROFLECTOR ELEMENT

This invention relates to a collimator.

If it is desired to so orient a reflector as to position it exactly perpendicular to a given direction, a beam of light may be projected along this direction and against the reflector. The reflector is so oriented that the return beam after reflection by the reflector coincides with the transmitted beam. If the reflector is badly misoriented, the returned beam will be so far off in a lateral direction from the transmitted beam that it may be difficult to find the returned beam, as the first step in orienting the reflector. If a means for detecting the returned beam is provided that will find a widely deflected returned beam, this detecting means may not be sensitive enough to permit correct orientation of the reflector. A means that makes proper orientation possible may not have a large enough field of view to find the widely deflected returned beam. Furthermore, if the returned beam comes back directly in line with the transmitted beam, attempts to directly observe the coincidence of the transmitted and returned beam will be blocked either by the reflector or by the source of light. If the transmitted and returned beam are deflected to one side of the transmit and return direction so that their coincidence can be observed, the beam deflection means itself may cause errors in determining the correct orientation of the reflector.

It is an object of this invention to provide an improved collimator which includes an improved return beam finding means and returned beam position indicating means.

It is a further object of this invention to provide a means that need not be carefully adjusted and that is insensitive to small errors of positioning of the reflecting means for reflecting the transmitted and returned beam to an observing position.

In accordance with this invention, means are provided for transmitting a beam to a reflecting surface whose orientation is to be adjusted. The returned beam, that is, the beam reflected by the reflecting surface to be oriented is deflected to one side where its position may be viewed in relation to a reticle on which the returned beam may be focused. Initial adjustment is made by orienting the reflecting surface until the image of the reflected returned beam is centrally located with respect to the reticle. Final adjustment of the orientation of the reflector is made by means of an apparatus which positions an image of the light source and an image of the reflector where they can be observed simultaneously. This last-mentioned apparatus includes a retroreflector. When the two images coincide in the last-named means, the reflector is so oriented that the two images are exactly coincident, that is, the reflector is positioned exactly perpendicular to the direction of the transmitted beam.

The invention may be better understood upon reading the following description in connection with the accompanying drawing in which:

FIG. 1 is an illustration of one embodiment of the collimator of this invention, and FIG. 2 is a diagram useful in explaining the operation of the collimator of FIG. 1.

Turning first to FIG. 2, a reflector 60 is to be oriented so that it is exactly perpendicular to a line 70. A source of light such as a laser 62 transmits light along the line 70, and the reflector 60 is oriented so that the light returned thereby is coincident with the light transmitted by the laser 62. At this orientation thereof, the reflector 60 is exactly perpendicular to the line 70. A collimator which may be used to indicate proper orientation of the reflector 60 is shown in FIG. 1.

As shown in FIG. 1, the collimator includes a lighttight housing 10, which includes a small diameter cylindrically tubular portion 12 which is joined to a larger diameter cylindrically tubular portion 14 by a conical portion 16, the axes of portions 12, 14 and 16 being aligned. A third cylindrical tubular portion 18, whose axis intersects the axes of the portions 12 and 14 at right angles is provided at the junction of the cylindrical portion 12 and the conical portion 16. The tubular portion 18 extends in opposite directions from the housing 10. A tube 20, whose axis is perpendicular to the axis of the cylindrical portion 14 extends perpendicular to the axis of the tube 14 at one side thereof, the tube 20 being located relatively nearer to the junction of the portions 14 and 16 than to the free end of the portion 14.

A converging lens system 22 is positioned in the portion 12 at the free end thereof and a pinhole aperture 24 is positioned in the tube portion 12 nearer the lens 22 than to the tubular portion 18. A semireflective mirror or semimirror 26 is positioned in the portion of the housing 10 which is common to the tubes 12 and 18, the semimirror 26 being positioned as nearly as practical at a 45° angle with the axis of the tube 12. A lens system 28, which may comprise several separate lenses, is positioned in the tubular portion 18 to one side, the lower as viewed in FIG. 1, of the housing 10. A flat mirror 30 is positioned beyond the lens system 28 in a direction away from the axis of the tube 12 and in the tubular portion 18 and at the focus of the lens system 28. A lens system 32 is positioned at the other end of the tubular portion 18, the lens system 32 being mounted to be moved towards or away from the axis of the tube 12.

A diverging lens 34 is positioned along the axis of the tube 14 nearer the junction of the tubular portion 14 and the conical portion 16 than the tube 20. A lens system 36 comprising the several lenses 38, 40 and 42 is adjustably positioned at the free end of the tube 20. A semimirror 46 is positioned at the intersection of the axis of the tubular portions 14 and 20 and at an angle of 45° therewith. A converging lens system 48 is positioned in the free end of the tube 14. A reticle 44 is fixed in position at the focal plane of the lens system 48 (here shown as one lens), and the lens system 36 is moveable with respect to the reticle 44 to accommodate the eye of the observer.

The operation of the described collimator is as follows: A source of light which may be the laser 62 of FIG. 2 is positioned to project its light beam into the lens system 22. The parallel rays of the beam are focused on the aperture 24 and continue on to hit the semimirror 26. Some of the rays are reflected into the lens system 28, and some of the rays continue towards the lens 34. The rays that hit the lens system 28 are focused on the mirror 30 and are reflected back through the lens system 28. The mirror 30 and the lens system 28 together form a retroreflector 31. That is, the light rays that pass through the lens 28 towards the mirror 30 and the light rays that pass through the lens system 28 from the mirror 30 move in opposite directions but are coincident in position. The rays that are returned by the retroreflector 31 go back directly in the direction that they came from for small angles of incidence of the light rays on the lens system 28 with respect to the axis of the lens system 28. The semimirror 26, which may be of the type commonly used in collimators, deflects a considerable amount of light from the source 62 downwards. In prior art collimators, this so deflected light is wasted. By the use of the retroreflector 31, which is in the path of this so deflected light, this otherwise wasted light is utilized. The light from the lens system 28 that gets through the semimirror 26 is focused on a focal plane 29 (indicated by dotted lines) in a position to be viewed through the eyepiece 32.

The light that passes through the semimirror 26 from the source 62 and along the axis of the housing 10 is caused to diverge by the lens 34, and some of this light passes through the semimirror 46. This light is caused to converge by the lens 48 and is projected on the reflector 60 to be oriented shown in FIG. 2. The lenses 34 and 48 taken together have a very long focal length compared to the focal length of the lens 48 alone and to the length of the collimator (about 20 times as long for example) and the beam that leaves the lens 48 has a small divergence (less than about 3 seconds of arc for example).

The light that is returned from the reflector 60 of FIG. 2 to be oriented passes through the lens 48 of FIG. 1 and hits the semimirror 46. The light that is reflected from the semimirror 46 is focused on the reticle 44 and is viewed through the eyepiece 36 comprising lenses 38, 40 and 42. The reflector 60 may be oriented until the image of the light reflected therefrom appearing on the reticle 44 is so positioned with respect to the reticle 44 that the beam transmitted to the reflector 60 and the beam returned therefrom are nearly aligned. However, since the field of the part of the collimator comprising the semimirror 46, the tube 20, the eyepiece lens system 36 and reticle 44 is so large as to readily find a beam returned by a poorly oriented reflector 60, this part of the collimator does not in itself provide an indication of perfect orientation of the reflector 60.

Some of the returned or reflected light hits the semimirror 26 after passing through the lens 34, and is focused on the focal plane 29. If the two images, the image of the source of light 62 which has passed through the retroreflector 31 and the image of the reflector 60 provided by the lenses 48 and 34 coincide at the focal plane 29 as viewed through the eyepiece lens system 32, then the reflector 60 is positioned perpendicular to the beam transmitted by the described collimator, whether or not the semimirror 26 is exactly 45° with respect to the axis of the tube 12. Due to the long focal length of the lenses 48 and 34 that provide the image of the reflector 60, a very small error in orientation of the reflector 60 produces a large distance or noncoincidence at the focal plane 29 between the images of the source 62 and of the reflector 60 as viewed through the eyepiece 32, whereby, by using the eyepiece 32, the field of view is very small. By orienting the reflector 60 to bring the two images together, exact orientation of the reflector 60 results. It is noted that the large-field-of-view image finder including the eyepiece 36 and the small-field-of-view image comparer including the eyepiece 32 are independent of each other and have no direct mechanical connection.

As noted above, for small variations of the angle of the semimirror 26 from 45° with respect to the axis of the tube 12, there is no error in orientation of the reflector 60 when using the described collimator due to the use of the retroreflector 31. This result is explained in connection with FIG. 2. In FIG. 2, the reference character 26 indicates the semimirror 26 when it is positioned exactly 45° with respect to the axis of the tubular portions 12 and 18, and the reference character 26' indicates the position of the semimirror 26 when it is tipped through a small angle (exaggerated in FIG. 2 for the purpose of explanation) from this 45° relationship. When the semimirror 26 is accurately positioned, and assuming the reflector 60 is properly oriented, the beam from the source 62 is reflected from one side of the semimirror 26 and from the mirror 30. The returned beam from the reflector 60 is reflected from the other side of the semimirror 26. These two beams coincide in direction as indicated by the line 70. If, however, the semimirror 26 takes the angular position 26' which is other than the desired 45° position, the light from the source 62 as reflected by the semimirror 26' and the mirror 30 will take the paths 64 and 66, while the returned beam from the reflector 60 as reflected from the semimirror 26' will take the path 68, whereby determination of proper orientation cannot result from the comparison of the beam 66 and 68. However, if a retroreflector 31 which includes a mirror 30 is substituted for the mirror 30 alone (as in FIG. 1), then the beam 64 will go back along its own direction after reflection by the retroreflector 31 (instead of going in the direction of the line 66) and the reflected beam 64 will be coincident with the beam 68, indicating proper orientation of the reflector 60. Therefore, for any angle of tilt of the semimirror 26 for which the retroreflector 31 returns an incident beam directly along its path, the described collimator gives correct indication of proper or improper orientation of the reflector 60 in spite of a variation of the angle of the semimirror 26 with the axis of the tube 12 from 45°. The correct indication of proper or improper alignment or orientation is also given whether or not the lens system 28 is tilted through small angles or translated in a plane perpendicular to its axis or whether the mirror 30 is tilted through a small angle. While the lens system 32 and 38 are defined herein as eyepiece lens systems, it is to be understood that they may have associated therewith suitable optical projection means or other desired arrangements for properly viewing the light images.

What is claimed is:
1. A collimator comprising:
    means for projecting light from a source onto a target reflector to be oriented, said target lying on an axis in the direction of projection of the light from said source to said target reflector;
    first reflecting means located along said axis and between said source and said target for reflecting from one side of said first reflecting means a portion of the light from said source at a given angle with respect to said axis;
    a retroreflector positioned at one side of said first reflecting means and said axis to return that portion of light from said source reflected by said first reflecting means along a path coincident with the arrival path thereof at said retroreflector;
    a first viewing means, positioned at the opposite side of said first reflecting means and said axis and responsive to said portion of light returned from said retroreflector and to a portion of light reflected by the other side of said first reflecting means;
    a second reflecting means located along said axis between said first reflecting means and said target and positioned at predetermined acute angle with respect to said axis for reflecting a portion of the light returning from said target; and
    a second viewing means, positioned at one side of said second reflecting means and said axis, said second viewing means being responsive to said portion of light reflected by said second reflecting means.

2. The collimator according to claim 1 wherein said first and second reflecting means comprise first and second semimirrors.

3. The collimator according to claim 2 wherein said retroreflector comprises a lens system and a mirror, the portion of light from said source reflected by said first semimirror impinging on said lens system first and said mirror second.

4. A collimator for positioning a target reflector with respect to an axis along the direction of the projection of light from a source to said target comprising:
    a converging lens system positioned along said axis between said source and said target;
    an aperture at the focus of said converging lens system;
    a first semimirror located along the axis and positioned at an acute angle with respect to said axis for reflecting a portion of the light from said source impinging on one side thereof and for reflecting a portion of the light returning from said target impinging on the other side thereof;
    a retroreflector positioned at one side of said first semimirror and said axis to return that portion of light from said source reflected from said one side of said semimirror along a path coincident with the arrival path thereof at said retroreflector;
    a first viewing means, having a certain field of view, positioned at the opposite side of said first semimirror and said axis and responsive to said portion of light returned from said retroreflector and to said portion of light reflected by said other side of said semimirror;
    a diverging lens system positioned along said axis between said first semimirror and said target;
    a second semimirror located along said axis between said diverging lens system and said target and positioned at a predetermined acute angle with respect to said axis for reflecting a portion of the light returning from said target; and
    a second viewing means, having a field of view larger than said certain field of view positioned at one side of said second semimirror and said axis, said second viewing means being responsive to said portion of light reflected by said second semimirror.

5. The collimator according to claim 4 wherein said retroreflector comprises a lens system and a mirror, the portion of light from said source reflected by said first semimirror impinging first on said lens system and then said mirror.

* * * * *

UNITED STATES PATENT OFFICE
CERTIFICATE OF CORRECTION

Patent No. 3,628,869  Dated  December 21, 1971

Inventor(s) Burton R. Clay, et. al.

It is certified that error appears in the above-identified patent and that said Letters Patent are hereby corrected as shown below:

On the cover sheet, insert --[73] Assignee  R C A Corporation, a corporation of Delaware -- .

Signed and sealed this 1st day of May 1973.

(SEAL)
Attest:

EDWARD M. FLETCHER, JR.
Attesting Officer

ROBERT GOTTSCHALK
Commissioner of Patents